(12) United States Patent
Schupp et al.

(10) Patent No.: US 12,416,130 B2
(45) Date of Patent: Sep. 16, 2025

(54) FOUNDATION FOR A STRUCTURE AND METHOD OF INSTALLING THE SAME

(71) Applicant: ØRSTED WIND POWER A/S, Fredericia (DK)

(72) Inventors: Jens Schupp, Gentofte (DK); Jan Pedersen, Fredericia (DK)

(73) Assignee: Ørsted Wind Power A/S, Fredericia (DK)

( * ) Notice: Subject to any disclaimer, the term of this patent is extended or adjusted under 35 U.S.C. 154(b) by 77 days.

(21) Appl. No.: 18/019,748

(22) PCT Filed: Aug. 9, 2021

(86) PCT No.: PCT/EP2021/072191
§ 371 (c)(1),
(2) Date: Feb. 3, 2023

(87) PCT Pub. No.: WO2022/034037
PCT Pub. Date: Feb. 17, 2022

(65) Prior Publication Data
US 2023/0279633 A1    Sep. 7, 2023

(30) Foreign Application Priority Data

Aug. 10, 2020   (EP) ..................................... 20190346

(51) Int. Cl.
*E02D 27/42*      (2006.01)
*E02D 7/24*       (2006.01)
(Continued)

(52) U.S. Cl.
CPC ............. *E02D 27/425* (2013.01); *E02D 7/24* (2013.01); *E02D 27/525* (2013.01); *F03D 13/22* (2016.05);
(Continued)

(58) Field of Classification Search
CPC ....... E02D 27/425; E02D 7/24; E02D 27/525; F03D 13/22; F05B 2240/95; F05B 2240/97
See application file for complete search history.

(56) References Cited

U.S. PATENT DOCUMENTS 3,398,071 A * 8/1968 Bagno ................... E04B 1/7007
                                                  205/766
4,046,657 A * 9/1977 Abbott ..................... E02D 7/26
                                                  204/515

(Continued)

FOREIGN PATENT DOCUMENTS

WO      2018115176 A1    6/2018

OTHER PUBLICATIONS

International Search Report and Written Opinion; International Application No. PCT/EP2021/072191; Orsted Wind Power A/S; dated Nov. 23, 2021.

*Primary Examiner* — Benjamin F Fiorello
(74) *Attorney, Agent, or Firm* — SandBright, PLLC; Robert Dan Spendlove

(57) ABSTRACT

A foundation (1) for a structure (7) comprising a body (8) having a lateral surface (11) and a distal end (10) for insertion into a soil (2). At least a region of the lateral surface (11) forms a first electrode. One or more second electrodes (9) are provided on the body (8) and are flush with or sit proud of the lateral surface (11). Each second electrode (9) extends transversely around the lateral surface (11) and is electrically insulated therefrom by an insulating strip (12) provided between the respective second electrode and the lateral surface. During installation, a voltage may be applied across the electrodes for inducing an electroosmosis effect to reduce installation resistance.

12 Claims, 7 Drawing Sheets

(51) Int. Cl.
    *E02D 27/52*     (2006.01)
    *F03D 13/20*     (2016.01)

(52) U.S. Cl.
    CPC ....... *F05B 2240/95* (2013.01); *F05B 2240/97* (2013.01)

(56) References Cited

U.S. PATENT DOCUMENTS

| | | | | |
|---|---|---|---|---|
| 4,119,511 | A * | 10/1978 | Christenson | B01D 61/56 204/600 |
| 4,124,483 | A * | 11/1978 | Christenson | E02D 7/00 405/232 |
| 4,157,287 | A * | 6/1979 | Christenson | B01D 61/56 204/515 |
| 4,305,800 | A * | 12/1981 | Christenson | E02D 7/26 204/515 |
| 11,072,901 | B2 * | 7/2021 | Schupp | E02D 27/525 |
| 2010/0224385 | A1 * | 9/2010 | Gordin | H01R 4/66 174/6 |
| 2020/0232103 | A1 * | 7/2020 | Jensen | F03D 80/00 |

* cited by examiner

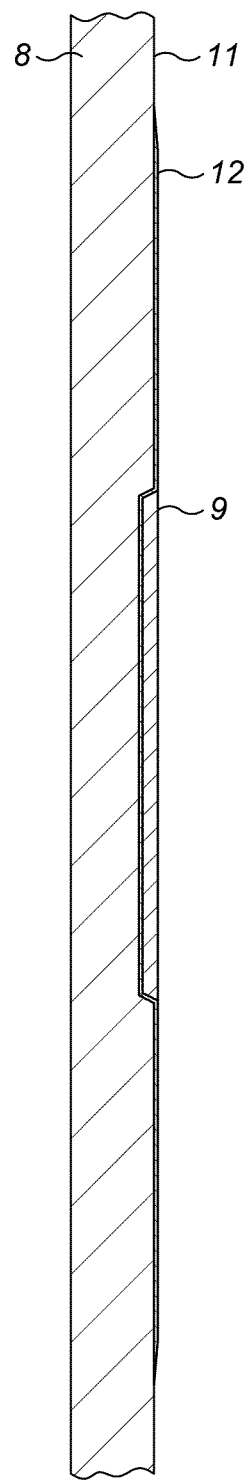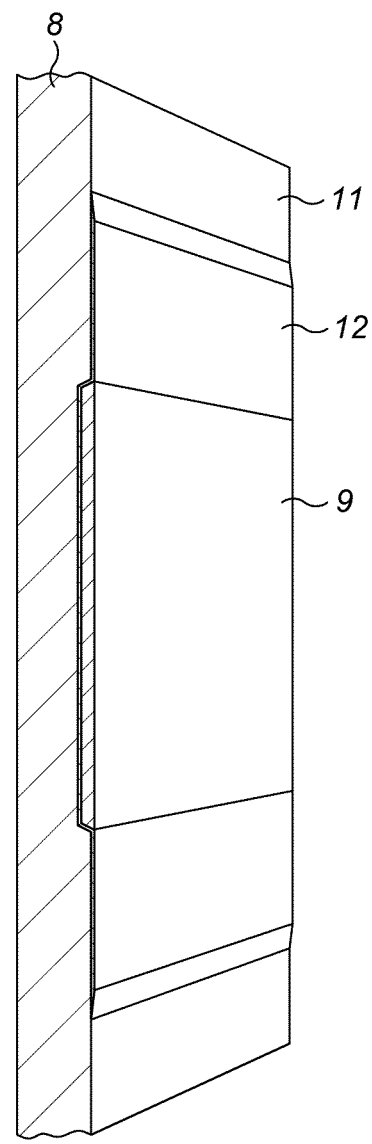
FIG. 7
FIG. 8

FOUNDATION FOR A STRUCTURE AND METHOD OF INSTALLING THE SAME

CROSS-REFERENCE TO EARLIER APPLICATION

This application is a § 371 National Stage Entry of PCT/EP2021/072191 filed Aug. 9, 2021 entitled "FOUNDATION FOR A STRUCTURE AND METHOD OF INSTALLING THE SAME" which application claims priority to EP Application No. 20190346.5 filed Aug. 10, 2020. The entire content of these applications are incorporated herein by reference.

The present invention concerns a foundation for a structure and a method and system for installing the same. In particular, the present invention concerns structural foundations, such as piles, tubular piles, closed ended piles, monopiles, bucket foundations, suction bucket foundations, suction pile foundations, suction caisson foundations, suction anchors, sheet piles, spudcans, shallow or gravity base foundations, and other types of temporary and permanent shallow or deep foundations, that may be inserted into a soil for supporting structures such as buildings, walls, sheet pile walls, offshore structures, and wind turbines. The foundations of the present invention are most suited to soils of low hydraulic permeability, typically with a high clay or silt content, as are often associated with offshore, deep sea, and coastal locations.

Structural foundations are often installed by driving the foundation into the ground using a pile hammer to apply a series of axial impacts to drive the foundation down into the soil. As it is driven, soil is displaced by the foundation pile, thereby compressing the surrounding soil and increasing the axial friction forces along the foundation's body. This thereby increases the foundation's axial load-bearing capacity. However, as the shear forces to overcome, while driving the foundation through the soil, are very high, several issues arise. Firstly, the high impact forces that are required for pile driving impose significant mechanical requirements on the foundation itself to avoid its failure during installation. Furthermore, the noise generated by the impacts can be extremely high. In the case of offshore installations, this poses a particularly significant environmental hazard to marine life.

In this respect, the installation of foundations for offshore structures can cause detrimental physical and behavioural effects to marine wildlife. In recent years, significant efforts have been made to mitigate the noise generated during such installations. For instance, bubble curtains or pile-in-pile systems are often required to reduce the level of noise emitted from the piling location. However, the use of such noise mitigating measures adds considerable expense to the installation of offshore structures. Furthermore, this is a particular issue for larger foundations where the increased dimensions can render current noise mitigation options insufficient.

To address the above, research has been made into using electro-osmosis to reduce the pile driving resistance in offshore installations by attracting water in the soil towards the foundation body acting as a cathode. The pore water pressure at the interface between the foundation body and surrounding soil builds up, reducing the effective stresses, and thereby lowering the friction between the soil grains and the foundation surface. This has a lubricating effect by reducing the shear resistance required to drive the foundation down into the ground. This in turn allows installation to be achieved with a lower number of impacts/hammer energy or even by using ballasting only without requiring a hammer. This may thereby facilitate quicker installation and less noise disturbance.

U.S. Pat. No. 4,157,287 discloses one such pile driving system using electro-osmosis. In U.S. Pat. No. 4,157,287, an electro-conductive tubular pile is provided with an electrically insulating coating on its exterior lateral surface and its interior lateral surface is left exposed to form a cathode. One or more anodes are then placed on the seabed adjacent to the pile and a direct current is applied to cause water to migrate through the soil down the outside of the pile towards the cathodic interior at its open end at the bottom. However, there are several issues with this arrangement. Firstly, the system of U.S. Pat. No. 4,157,287 requires anodes to be installed on the seabed adjacent to the pile. This adds considerably to the set-up time and expense of the installation. Secondly, to generate sufficient field strength to achieve an electro-osmotic effect, very high voltages are required because of the long distance between the electrodes, which itself is hazardous. Thirdly, because of the high voltages, the integrity of the electrical insulation over the entire exterior of the pile is crucial to avoid short circuiting. This makes the manufacture of such piles for use in this system much more expensive and less tolerant to defects. In practical terms, this means that the technique is too risky commercially to rely on; a bubble curtain and larger hammer would still be required at the location as a contingency if the coating was to fail during installation. As such, any potential cost savings are negated.

Faced with these issues, the Applicant's own developments in this field led to the invention disclosed in WO2018/115176. In this case, an anode was provided as a strip secured to the body of the foundation, with a recess or projection being used as a spacing formation to form a gap between the anode surface and the soil when the foundation was installed. In use, the body acts as the cathode and, since both electrodes were effectively integrated into the foundation itself, this avoided the need to provide and install a separate counter-electrode in the seabed. At the same time, although the soil around the anode would dehydrate, the spacing formation acted to prevent adhesion with the dehydrated soil.

Although the concepts taught in WO2018/115176 have proven to be effective, there have been some practical challenges with its commercial adoption. Firstly, the spacing formation has proven to be challenging to implement. Whilst some embodiments proposed seating the anode in a recess to provide a gap with the soil, it is relatively expensive to machine a recess of sufficient depth into the monopole body to create the necessary spacing. Other embodiments involved the use of a driving shoe as a spacing projection attached to the main lateral surface of the monopile body. However, such projections are prone to damage and testing has shown that, in many soil conditions, they have been ineffective at keeping the soil sufficiently separated from the anode.

The present invention therefore seeks to address the above issues with the prior art.

According to a first aspect of the present invention there is provided a foundation for a structure comprising: a body having a lateral surface and a distal end for insertion into a soil, wherein at least a region of the lateral surface forms a first electrode; and one or more second electrodes provided on the body and being flush with or sitting proud of the lateral surface, each second electrode extending transversely around the lateral surface and being electrically insulated therefrom by an insulating strip provided between the respective second electrode and the lateral surface.

In this way, the present invention provides an arrangement in which the foundation assembly itself comprises both first and second electrodes, which thereby avoids the need to provide and install a separate counter-electrode in the seabed. At the same time, because the second electrode provides a circumferential band which sits flush with or proud of the lateral surface, a relatively large electrode surface area may be provided with no or very minimal modification to the foundation body. This contrasts with earlier solutions which necessitated deep recesses to be machined into the body or employed smaller vertical electrodes sheltered behind driving shoe projections. As such, embodiments of the invention may be implemented straightforwardly and cost-effectively.

In use, an electric potential difference may be established between different regions in the soil surrounding the foundation itself to thereby induce electro-osmosis and hence effect the pumping of water through the soil. At the same time, because the potential difference can be established between different regions of the foundation, the distances between the electrodes may be relatively shorter, thereby allowing lower voltages to be used whilst still generating a sufficiently strong electric field for inducing electro-osmotic flow. During foundation installation, where the second electrode is the anode and the body is the cathode, water in the surrounding soil is attracted to the body, softening the soil and forming a lubricating film over its lateral surfaces. This allows the foundation to be driven more easily. Although adhesion of dehydrated soil around the second electrode will counter this, the net benefit is a significant overall reduction in installation resistance. Furthermore, a plurality of electrodes may be provided axially distributed along the body for establishing an electroosmotic effect over an enlarged region of the body.

In embodiments, the one or more second electrodes comprise a plurality of second electrodes provided as bands across the body. As such, each second electrode may be formed from a continuous sheet of metal, which is then then wrapped around the whole or part or the circumference of the body to conform to the lateral surface. This may thereby simplify manufacture.

In embodiments, each insulating strip is provided as a band across the body. This may simplify manufacture because each insulating strip may, for example, be formed from a narrow piece of insulating material, such as an extruded polymer or a fibre reinforced plastic sheet, which is then glued to the lateral surface. Alternatively, the insulating strip may be formed, for example, by painting insulating paint directly onto the lateral surface of the body. In such a case, the insulating paint may also provide the adhesive which secures the second electrode.

In embodiments, each insulating strip is wider than its respective second electrode. In this way, exposed regions of insulating strip above and below the second electrode provide an insulating buffer at the boundary between the electrodes and thereby help to regulate the electric field between them. That is, the width of the insulator is designed to limit the current density. For example, this helps to maintain safe temperature levels that may otherwise soften the adhesive.

In embodiments, the body is electrically conductive for functioning as the first electrode. In this way, the bulk material of the foundation body may form a common first electrode. For instance, the body may be grounded with a 0V potential for minimising safety issues with entities contacting the body.

In embodiments, the insulating strips are provided on the lateral surface of the body and each second electrode is provided on its respective insulating strip. In this way, the insulating strips may be applied directly to the body, with the second electrodes mounted onto the insulating material.

In embodiments, the second electrodes define the outer boundary of the foundation in the transverse plane. In this way, the second electrodes may be fixed to the outer surface of standard foundation, without requiring additional customisation of the foundation body.

In embodiments, the foundation further comprises wedge elements provided at the boundaries between the insulating strips and their respective second electrodes, each wedge element tapering radially outward from the insulating strip to the respective second electrode. In this way, the exposed edges of the second electrode may be protected to prevent delamination of the second electrode fixture during the foundation installation process.

In embodiments, the body comprises an insertion region, terminating in the distal end, for insertion into the soil, and wherein the plurality of second electrodes are axially distributed along the insertion region.

In embodiments, one or more of the plurality of second electrodes are connectable to the electric power supply independently of one or more other second electrodes. As such, the second electrodes may be selectively activated for restricting their operation until the respective second electrode is below the soil surface. In some embodiments, the plurality of second electrodes are configured to have different potentials in use. For example, where electrodes are provided on both the inside and outside of a hollow foundation, the electrode potential may be adjusted to provide different levels of lubrication between the surfaces. The interior and exterior of a bucket foundation for instance may be controlled to address the issue of plug lift. Plug lift occurs when suction forces during the suction assisted installation phase are sufficiently high to cause a clay layer overlaying a sand layer to be lifted inside the bucket. To address this, the lubrication on the outside of the bucket may be maximized by using a higher potential for reducing the required suction pressure. At the same time, the lubrication on the inside of the bucket may be set at a lower level or even reversed so that there is sufficient friction between plug and the inside of the bucket foundation for preventing the plug from sliding upwards.

In embodiments, each insulating strip comprises a resistively tapered region extending axially either side of its respective second electrode for regulating the spatial distribution of the electric field strength between the first and second electrodes.

In embodiments, the foundation further comprises a plurality of fluid ports for supplying fluid to the surface of one or more of the plurality of second electrodes. In this way, when the second electrode is functioning as an anode during installation, fluid can be supplied to the second electrode to maintain electrolyte conductivity as water is pumped into the soil, away from the electrode. When the second electrode is functioning as a cathode during a stabilisation operation, fluid may also be drawn away from the second electrode site and pumped out elsewhere through an exhaust. This may avoid excessive softening in the soil surrounding the second electrode. Preferably, the fluid port connects to a fluid pipe system for providing fluid communication between the fluid port and a fluid pump. Preferably, the fluid pipe system extends to the proximal end of the foundation. Preferably, the fluid pipe system comprises an electrically insulated bore for preventing short circuiting. After installation, the fluid port and piping system may be sealed with grout or resin to stop water from being drawn down to this area while the foundation undergoes cyclic loading. Furthermore, in embodiments, a second fluid port and second piping system may also be provided so that the fluid can be circulated. This can be used to circulate electrolyte for optimising the electro-osmosis effect or electro chemical soil cementation.

In embodiments, the body is tubular. For instance, the foundation may be a monopile and may have an elongate tubular body that is over 10 m or 20 m long. In other embodiments, the foundation may be a bucket foundation having a circular footprint, and the bucket foundation may have a diameter of 4-16 metres and a vertical length of 2-30 metres, and preferably 7-12 metres in diameter and 2-9 meters penetration depth. In embodiments where the body has a hollow cavity, it may comprise an inner lateral surface.

According to a further aspect of the present invention, there is provided a wind turbine comprising: a generator assembly for generating electricity from wind; and a foundation according to any of the above for supporting the generator assembly. In this way, the foundation may provide the wind turbine's base, with the nacelle and rotor of the wind turbine generator assembly being supported above the foundation. The wind turbine may be installed for instance off-shore.

According to a further aspect of the present invention, there is provided a method of installing a foundation according to any one of the above statements, the method comprising: connecting one or more of the plurality of second electrodes to the positive terminal of a power supply for the second electrode to function as an anode; connecting the first electrode to the negative terminal of the power supply for the first electrode to function as a cathode; inserting the distal end of the body into the soil and applying a potential difference across the first and at least one of the second electrodes for generating an electro-osmotic effect to attract water in the soil to the first electrode for thereby facilitating the insertion of the body into the soil. In this way, the foundation may be driven into the soil more easily.

According to a further aspect of the present invention, there is provided a method of arresting the installation process of a foundation according to the above, the method comprising: connecting the second electrode to the negative terminal of a power supply for the second electrode to function as a cathode; connecting the first electrode to the positive terminal of the power supply for the first electrode to function as an anode; applying a potential difference across the first and second electrodes for generating an electro-osmotic effect to repel water in the soil away from the first electrode. In this respect, when the foundation is installed using ballast, the installation rate is primarily governed by the provided downforce. At the same time, the faster the installation rate the greater the resistance, and vice versa. As such, it can sometimes be difficult to stop the installation process altogether as soon as the target penetration depth is achieved because there is often too much ballast on the foundation. For example, ballast is often applied to the foundation using a number of liftable ballast units, of for instance 1000 t. Once the target installation depth is achieved, it can therefore be difficult to quickly remove enough units to reduce the downforce to a sufficiently low level that the foundation stops penetrating altogether. That is, even if some ballast units are removed, the foundation will continue to penetrate, albeit at a much-reduced rate. As such, the arresting method acts to rapidly stop the lubrication effect by reversing the polarity. Although the previously anodic electrodes may now become partially lubricated, the area ratio is now in favour of increasing the installation resistance. Furthermore, in some soil conditions, soil which has baked to the second electrode during installation may not allow for lubrication in this region when the polarity is reversed.

According to a further aspect of the present invention, there is provided a method of stabilising a foundation according to the above, the method comprising: connecting the second electrode to the negative terminal of a power supply for the second electrode to function as a cathode; connecting the first electrode to the positive terminal of the power supply for the first electrode to function as an anode; applying a potential difference across the first and second electrodes for generating an electro-osmotic effect to repel water in the soil away from the first electrode. In this way, the soil surrounding the body of the foundation may be consolidated for strengthening the shear resistance between the foundation body and the soil. This allows the foundation to be stabilised. Indeed, not only may the interface strength between the soil and the foundation be restored to normal levels, but potentially the effect of additional soil consolidation may allow the interface strength to be improved beyond this. Moreover, this effect may also extend to beyond the immediate vicinity of the foundation. In addition, the stabilising process may also help to at least partially neutralise acidity that may have been generated in the soil during the installation process. That is, with the second electrode acting as the cathode, $OH^-$ ions are generated in the pore water in the surrounding soil, which can neutralise $H^+$ remaining from the installation processes.

According to a further aspect of the present invention, there is provided a method for adjusting a foundation according to the above that has been inserted into soil, the method comprising: connecting the second electrode to the positive terminal of a power supply for the second electrode to function as an anode; connecting the first electrode to the negative terminal of the power supply for the first electrode to function as a cathode; applying a potential difference across the first and second electrodes for generating an electro-osmotic effect to attract water in the soil to the first electrode; and moving the body in the soil. In this way, the foundation may be adjusted more easily, for example allowing the foundation to be retracted from the soil. This method may also be used to adjust the position of the foundation, for instance to reset a foundation which has moved due to extreme loading. This may be especially relevant for bucket foundations by reducing the friction to re-level the bucket for straightening the structure. In strong clay type soils, conventional methods of re-levelling of bucket foundations can be extremely difficult because the water pressure required to uninstall a bucket risks cracking the soil underneath. Often this means that inclined bucket foundations cannot be salvaged, and the bucket must be instead cut at the mudline to remove it. Embodiments of the present invention therefore provide for the elevation of single buckets to be corrected after a structure has become inclined beyond an acceptable limit.

Illustrative embodiments of the present invention will now be described with reference to the accompanying drawings in which:

FIG. 7 shows a cross-sectional view through a second electrode according to a second embodiment;

FIG. 8 shows an isometric section view through the second electrode shown in FIG. 7;

Figure 1:
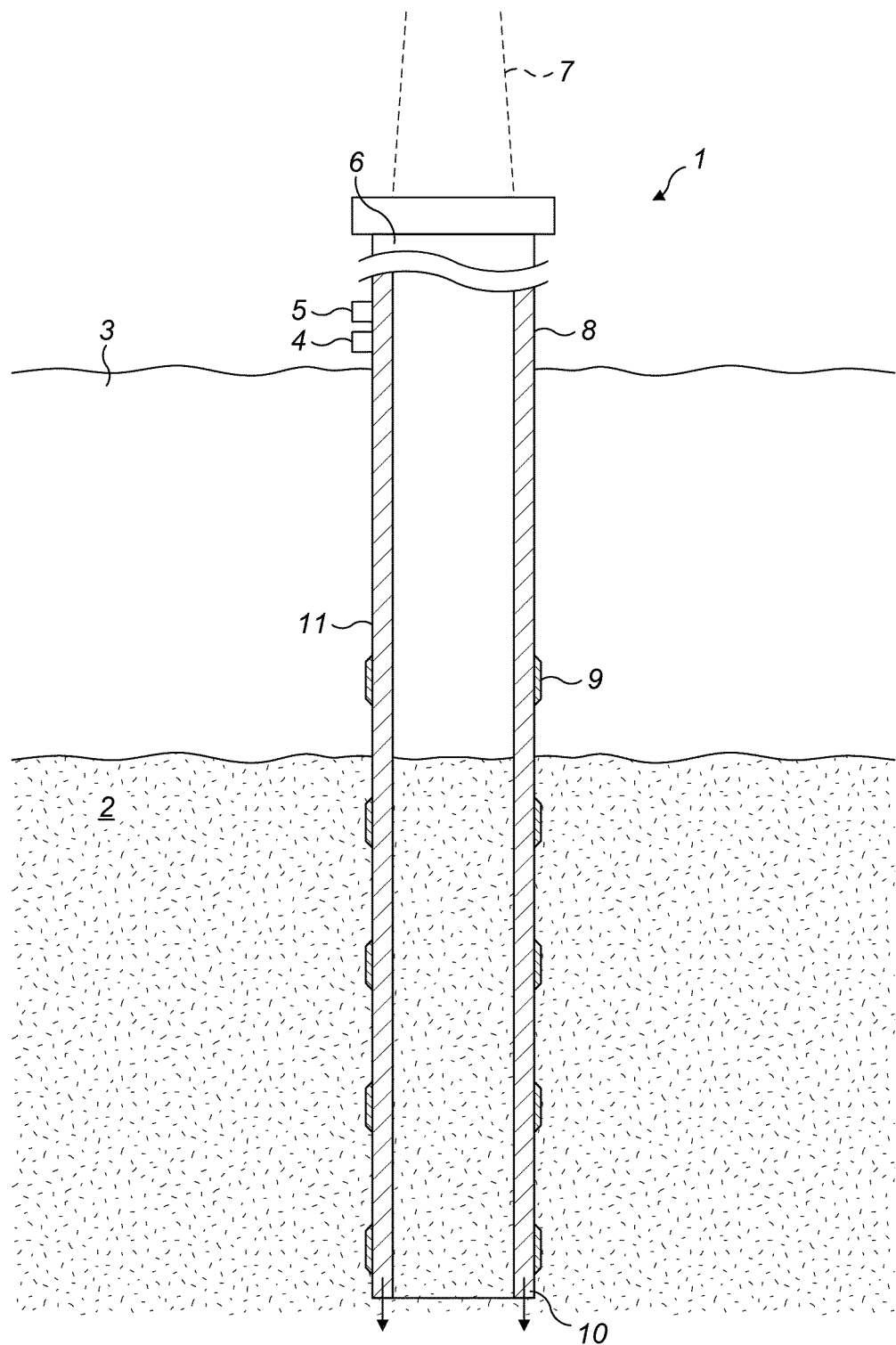
FIG. 1 shows a schematic cross-sectional view of a foundation during installation according to a first embodiment of the invention.

FIG. 1 shows a schematic cross-sectional view of a foundation during installation according to a first embodiment of the invention. In this embodiment, the foundation 1 is a monopile for an offshore wind turbine 7. The foundation 1 comprises a hollow tubular body 8 having a proximal end for supporting the wind turbine 7 above the water level 3 and a distal end 10 that has been inserted into the soil 2. The body 8 is electrically conductive for allowing its external lateral surface 11 to function as a first electrode. In this embodiment, the body 8 is formed of metal for providing the electrical conductivity throughout the material, although other configurations are possible. For instance, other materials may be used, and/or conductive regions may be formed by applying a conductive coating to exposed surfaces. A first terminal 4 is provided at the proximal end of the body 8 for electrically connecting the terminal 4 to a power supply (not shown).

As will be described in further detail below, a plurality of second electrodes 9 are formed over an insertion region of the body toward its lower, distal end. The second electrodes 9 are formed as circumferential bands which extend around the exterior lateral surface 11 and are individually switchably connected to a second terminal array 5 at the proximal end of the body 8 by wiring (not shown). As such, the second electrodes 9 can each be activated as part of the electroosmosis circuit.

Figure 2:
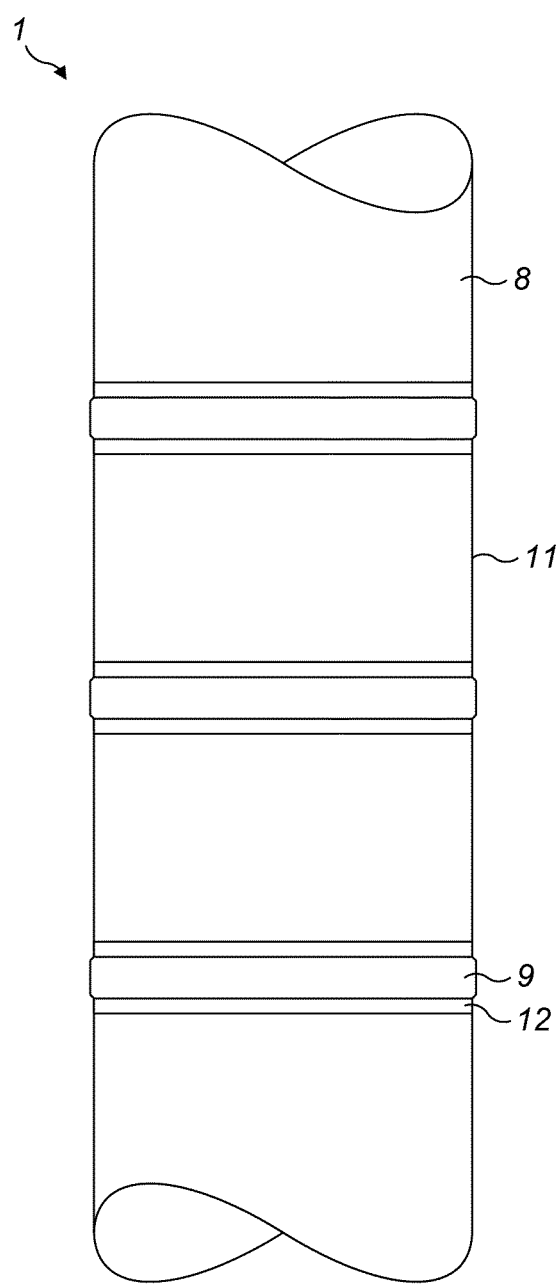
FIG. 2 shows an enlarged view of an insertion region of the foundation's body shown in FIG. 1.

FIG. 2 shows an enlarged view of the insertion region of the body 8. As shown, the second electrodes 9 extend transversely across the exterior lateral surface 11 of the body 8 as a plurality of circumferential bands. The second electrodes are secured to a transverse insulating strip 12 of insulating material provided on the body's lateral surface 11 for electrically insulating the second electrodes 9 from the body 8. As shown, the insulating strips 11 are wider than the bands of second electrode 9 such that the insulating material extends vertically either side of the upper and lower boundaries of the second electrodes 9. In use, the second electrodes 9 may be selectively activated to electrically connect them to a power supply through the terminals within the second terminal array 5 for thereby establishing a potential difference between each activated second electrode 9 and the body 8 acting as the first electrode. In this respect, the generated electric field will decrease as the axial distance from an activated second electrode increases. Accordingly, where two identical adjacent second electrodes 9 are activated with the same voltage, a voltage gradient is formed between the two, with the lowest field strength around the mid-point between the electrodes, depending on the homogeneity of the soil. The distance between the second electrodes 9, as well as the width of the insulation strip 12 may therefore be configured to optimise the voltage gradient to achieve a sufficient field strength along the length of the insertion region, as well as limit current density spikes which would otherwise result in excessive heating of the soil.

Figure 3:
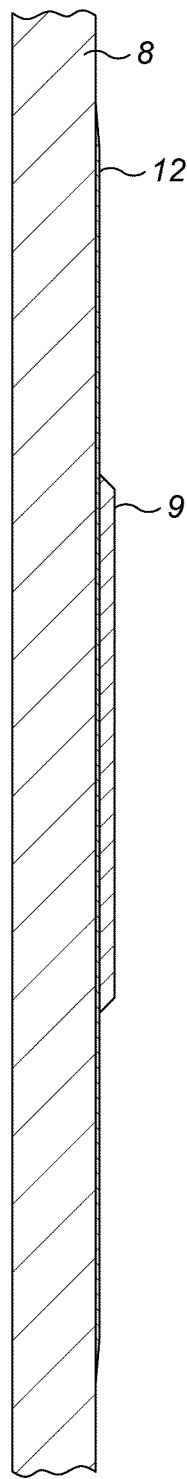
FIG. 3 shows a cross-sectional view through a second electrode according to the first embodiment.
Figure 4:
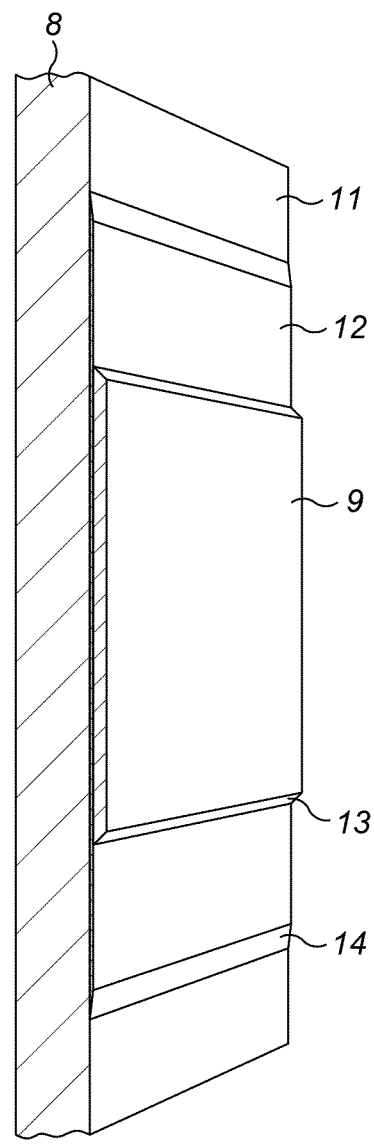
FIG. 4 shows an isometric section view through the second electrode shown in FIG. 3.

FIGS. 3 and 4 show a cross-sectional and isometric section views through the second electrode 9. In this embodiment, the insulating strip 12 is provided as a glass reinforced plastic sheet applied as a transverse band around the lateral surface 11 of the body 8 using epoxy glue. The glass reinforced plastic sheet is preferably between 1-2 mm thick, and in this embodiment is 1.3 mm thick. In other embodiments, an insulating paint may be applied to the lateral surface 11 to form the insulating strip.

Two wedge shape formations 14 of the epoxy glue are provided at the upper and lower boundaries of the insulating strip 12 to provide a tapered joint between the surfaces and thereby mitigate the risk of delamination in use. The second electrode 9 is provided as an aluminium sheet glued to the insulating strip 12 and conformed around the lateral surface 11 of the body. As such, the second electrode 9 sits proud of the lateral surface. Two further wedge shape formations 13 of the epoxy glue are provided at the upper and lower boundaries of the second electrode 9 to provide a tapered joint between the surface of the insulating layer 12 and the second electrode 9 for mitigating the risk of delamination. In this embodiment, the second electrode 9 is 200 mm wide from its bottom to top boundary, while the insulating strip 12 is 500 mm wide from its bottom to top boundary. As such, the insulating strip 12 extends axially both above and below the second electrode 12 forming two insulating bands between the lateral surface 11 and the second electrode 9. As such, when a potential difference is applied across the electrodes, the exposed regions of insulating material act as buffers for directing the electric field and to limit the current density.

Figure 5C:
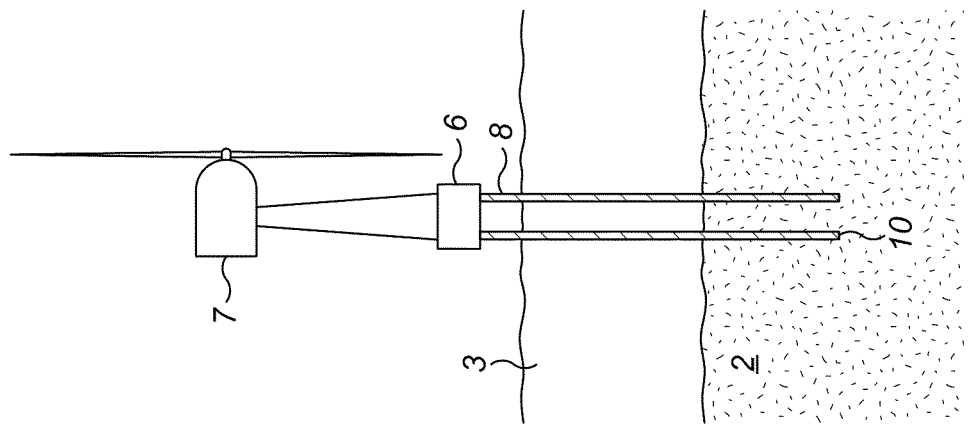
FIGS. 5A-5C show schematic representations of an offshore wind turbine being installed using a foundation, system, and method according to embodiments of the invention.
Figure 5B:
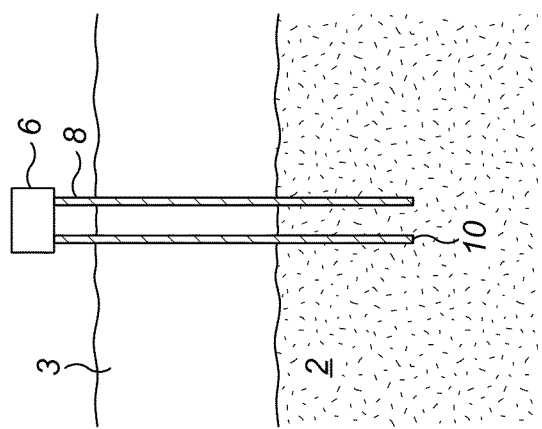
Figure 5A:
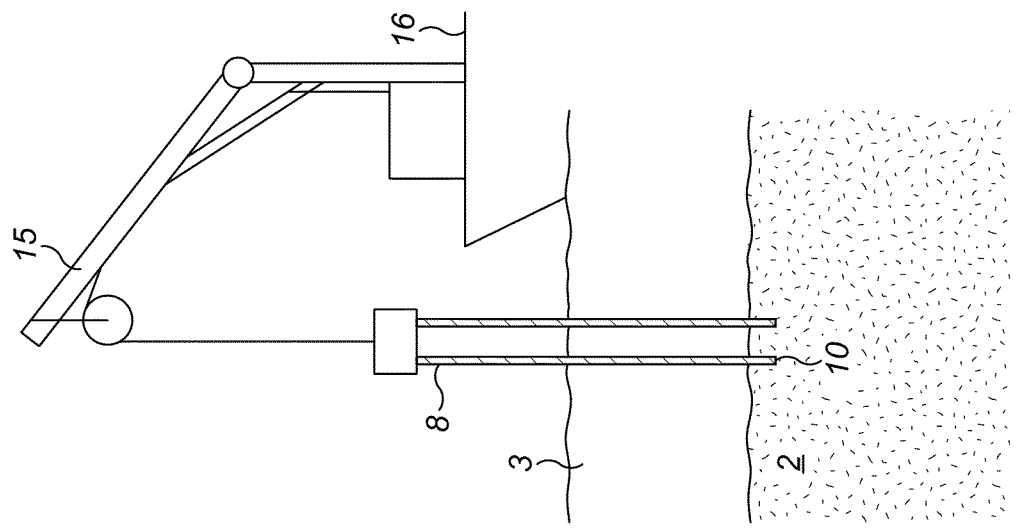

FIGS. 5A-5C show schematic illustrations of the foundation of FIGS. 1 and 2 being installed. As shown in FIG. 5A, the body 8 of the foundation 1 is positioned by a crane 15 on the installation vessel 16 with its distal end 10 slightly submerged into the soil 2. As is described in further detail below, once the first second electrode 9 is covered with soil, a DC power supply on the installation vessel 16 may be used to apply a potential difference through the first and second terminals 4 and 5 to establish the electro-osmosis effect. The body 8 may then penetrate deeper into the soil 2 as the shear resistance between the soil and the lateral face of the body 8 is reduced. Penetration may be facilitated under the weight of the foundation itself, or by applying additional ballast or pile driving hammer impacts. Advantageously, with embodiments of the present intention, the installation resistance may be sufficiently reduced that installation can be achieved without the need to apply hammer impacts.

Once the distal end 5 of the foundation has reached the required depth, as shown in FIG. 5B, the shear resistance between the soil 2 and the body 8 can be restored by turning off the power supply. This stops the electro-osmosis effect and stabilises the foundation by reducing its lubrication. However, this stabilisation may take time. This is because clay has a very low permeability, and hence excess pore pressure next to the foundation can take time to dissipate back into the soil. Therefore, stabilisation may optionally be further enhanced by temporarily reversing the polarity of the power supply so that the body 8 acts as the anode and the second electrode 9 acts as the cathode. This reverses the electric field so that pore water is driven away from the lateral surface 11 of the body 8, thereby enhancing the adhesion strength of the interface between the body 8 and the soil 2. As shown in FIG. 5C, a wind turbine 7 may then be installed on top the foundation 1. It will be appreciated that the stabilisation effect may also be used to remove excess pore pressures around an axial or monopile foundation which might have been accumulated during cyclic loading. Stabilisation maintenance may alternatively be implemented using one or more remote anodes.

Figure 6:
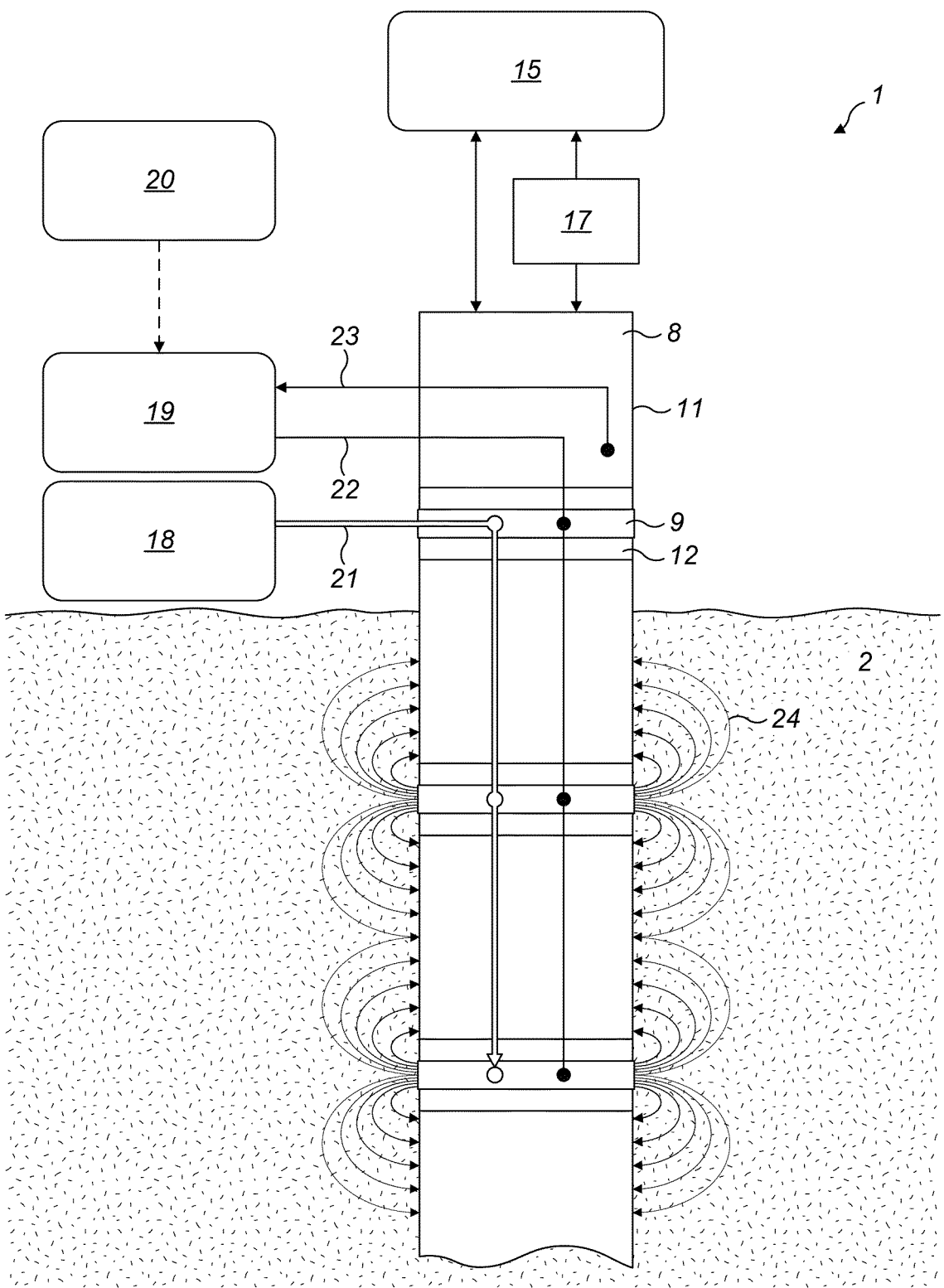
FIG. 6 shows a schematic representation of a foundation according to the first embodiment of the invention being installed, with electric field lines shown.

FIG. 6 shows a schematic representation of a section of foundation 1 during the installation process. As such, electric field lines 24 are shown between the second electrode 9 and the lateral surface 11.

As mentioned above, during the installation process, the body 8 is lifted into place by the crane 15 and a ballast 17 may be applied to its proximal end to facilitate its penetration into the soil 2. As the distal end of the body 8 is pushed down, the second electrodes 9 are activated sequentially to become anodes as they are buried in the soil 2. For this, a potential difference is applied by a DC power unit 19 provided on the installation vessel and fed by an AC generator 20. The sequential activation of the second electrodes 9 helps to avoid drawing excessive currents through the seawater during the initial stages of installation where the electrodes 9 are still above the soil 2. As such, second electrodes 9 may remain uncharged until they are safely below the soil line, after which they may be connected to the DC power unit 19 for creating the electro-osmosis effect in that region.

In this respect, specifically, the DC power unit 19 is used to ground the body 8 through a first power cable 23 such that it has a 0V potential and may thereby function as the cathode. As the body 8 itself has a zero potential, it doesn't present a safety hazard from contact with other bodies during installation. At the same time, a positive voltage of preferably around +40V to +400V, and most preferably below around +200V, is applied through the second power cable 22 to each activated second electrode 9. At voltages below around +80V, the voltage is advantageously below hazardous levels. Furthermore, as a consequence of the selective activation of the second electrodes 9, the charged region of the foundation is isolated to the installed region of the body which is buried beneath the soil 2. The application of the potential difference between each activated second electrode 9 and the body 8 generates an electric field 24 through the soil between them.

An irrigation pump 18 may also be provided on the installation vessel to feed fluid through fluid channel 21 to ports provided in or adjacent to the second electrodes 9. This fluid may be, for example, sea water and its delivery may help to reduce surface friction and soil consolidation at the second electrodes 9.

The effect of the electric fields shown in FIG. 6 are that an electro-osmosis effect is induced by the electric field 24 in the soil around the foundation. Specifically, within the soil, the negatively charged soil particles are surrounded by pore water fluid that lies within the double layer and/or in the unbound water zone between the particles. The application of the electric field 24 moves a portion of this pore water toward the negatively charged cathode provided by the lateral surface 11 of the body 8. This has the effect of increasing soil moisture in the soil adjacent to the lateral surface 11, thereby lubricating the interface between the body 8 and the soil 2.

At the same time as the above, the positively charged anode provided by the second electrode 9 acts to repel pore water from it. This results in a consequential decrease in soil moisture in the surrounding soil, with the dehydrated region sticking to the surface of the second electrode 9 and ultimately baking itself to it. However, whilst this increased soil adhesion increases the axial resistance to the installation of the body 8, it has unexpectedly been found that the overall reduction interface resistance over the bulk of the lateral surface 11 more than compensates for this. That is, although soil may adhere to the second electrode 9, testing by the applicant has shown that the lubrication over the rest of the insertion region of the foundation's body nevertheless provides a significant net reduction in installation resistance. Adhesion, for example, is limited to a horizontal annulus of soil surrounding each second electrode 9.

Advantageously, because the second electrode does not need to be spaced from the soil and may be on or proud of the main lateral surface 11 of the foundation body 8, there is no need to customise the foundation to provide recesses or spacing projections. As such, not only is reliability improved but foundation costs may also be reduced. For example, an otherwise conventional monopile may be easily modified by securing insulating strips 12 and second electrodes 9 to its surface 11 using an adhesive.

It will be understood that alternative configurations may be used for the second electrode 9, with these functioning in substantially the same way to that described above in relation to the first embodiment. FIGS. 7 and 8, for example, show cross-sectional and isometric section views through a second electrode according to a second embodiment of the invention. In this case, the insulating strip 12 is applied as a 1.5 mm layer of insulating paint and the second electrode 9 is seated within a recess provided in the lateral surface. As such, the second electrode 9 sits substantially flush with main lateral surface 11 of the foundation body 8. This provision of a shallow recess, which may be only 3-5 mm deep, can act to protect the second electrode 9 from delamination from the body 8, without requiring a much deeper recess that would otherwise be needed to create a gap with the adjacent soil.

Figure 9:
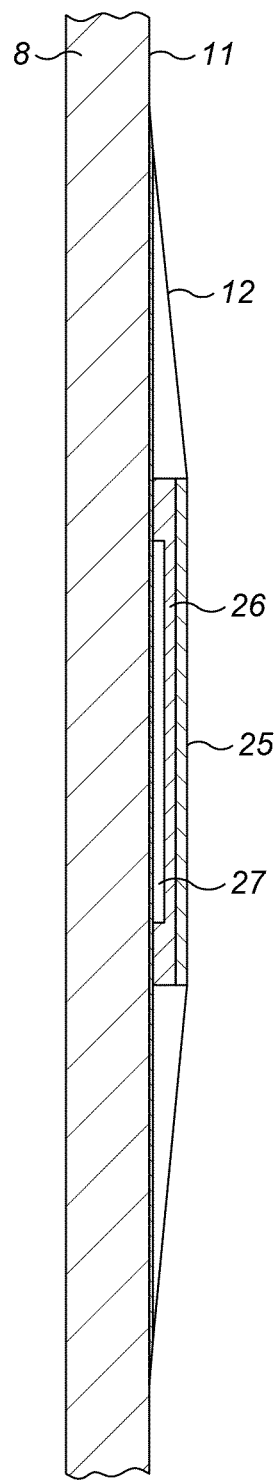
FIG. 9 shows a cross-sectional view through a second electrode according to a third embodiment.
Figure 10:
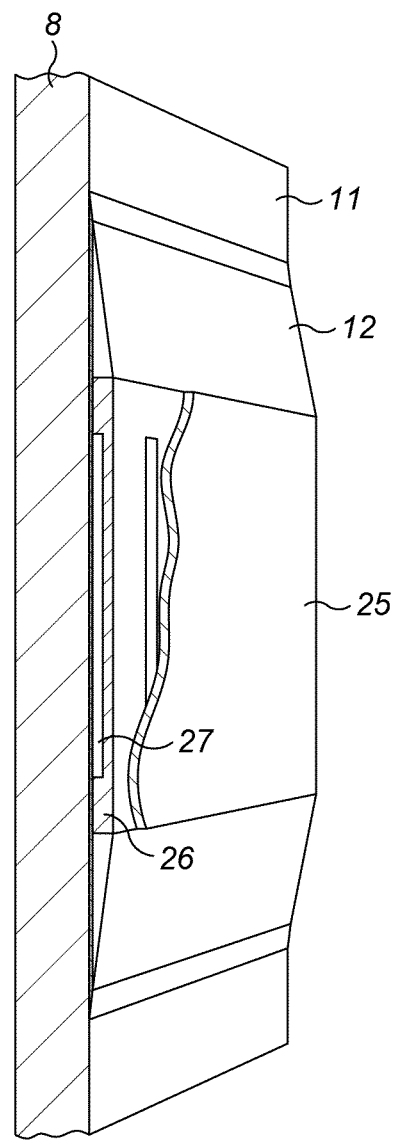
FIG. 10 shows an isometric section view through the second electrode shown in FIG. 9.

FIGS. 9 and 10 show cross-sectional and isometric section views through a second electrode according to a third embodiment of the invention. In this embodiment, the second electrode 26 is formed of a machined aluminium piece comprising an inward facing cavity 27 and a plurality of slits through to the outer face. A cover 25 is fitted over the outer face of second electrode 26 and comprises a non-woven aramid fibre, covered by a woven Kevlar (aramid fibre) top sheet. In this embodiment, the second electrode 26 is glued to an insulation paint layer forming the insulation strip 12 applied to the main lateral surface 11. In other embodiments, the electrode could alternatively be seated in a recess. In use, fluid may be fed to the cavity 27 using the irrigation pump 18, which in turn is drawn through the slots. The cover 25 acts to wick the fluid, thereby disbursing and releasing fluid over the exposed surface. As such, the Kevlar top acts to prevent soil baking onto the second electrode 26. At the same time, the delivery of fluid acts to re-hydrate the soil adjacent to the respective second electrode 26, which thereby helps to maintain the electrolyte fluid connection between the anode and cathode. In some embodiments, additives may further be introduced to the fluid pumped from the irrigation pump 18, for example, to enhance its conductivity or provide chemical stabilisation. In other embodiments, fluid ports may also be used to finalize the installation by supplying grout or similar material for sealing the piping system and displacing any remaining water which is trapped in the cavity 27.

In this connection, the delivery of fluid at the second electrodes 26 may also be used to neutralise or dilute the acidity generated at the anode. That is, in addition to the electro-osmotic effect, electrolysis results in chemical oxidation and reduction reactions at the anode and cathode respectively. The range of possible reactions depends on what ionic species are available or present and thus the introduction of tailored conditioning agents can serve to enhance or suppress particular reactions. As an example, in pure water with inert electrodes $H_2$ gas and $OH^-$ anions are generated at the cathode and O2 gas and $H^+$ cations are generated at the anode. As a result of the electric field, the cations and anions migrate towards cathode and anode respectively. Because of the higher mobility of $H^+$ cations, the associated acid front generally sweeps across a larger volume of soil compared to that swept by hydroxide anions. This acidity in the soil can have several unwelcome effects including reducing biological activity, lowering the electroosmotic permeability of the soil and accelerating corrosion of the foundation itself. To counter these effects, chemical conditioning fluid may be pumped from ports to neutralise or dilute the positively charged $H^+$ ions. In addition, conditioning fluids may be selected to modify the surface chemistry of clay particles, or to precipitate cements in pore spaces. Such changes can increase the strength and stiffness of the soil. For instance, during phases of normal polarity, lime or calcium chloride solutions may be introduced through ports as modifying agents, upon reverse polarity such conditioners could include sodium silicate to participate in cementation reactions.

The arrangement shown in FIGS. 9 and 10 may also be used without active irrigation. In this respect, during installation, the foundation is first lowered through water before penetrating into the soil. This step acts to partially fill the cavity 27 in the second electrode 26 with sea water. At the same time, the air remaining in the cavity 27 is compressed. As such, when sea water is drawn from the cavity 27 during electroosmosis, the compressed air expands back, thereby preventing a vacuum being immediately formed in the cavity 27.

As will be appreciated, the inventive arrangements disclosed herein allow a foundation to be driven into the soil more easily, without significantly extending the set-up time required at the foundation location. This reduces cost, provides a more stable foundation, and allows installation noise to be mitigated in the case of pile foundations, which is particularly important for offshore applications. At the same time, embodiments of the invention may be implemented easily, without requiring substantive modification to existing foundation designs.

It will be understood that the embodiments illustrated above show applications of the invention only for the purposes of illustration. In practice the invention may be applied to many different configurations, the detailed embodiments being straightforward for those skilled in the art to implement.

For example, although in the above illustrative embodiments, the foundation has been a hollow body such as a monopile, the invention may be applied to other foundations, such as bucket foundations, axial piles and sheet piles, spudcans, and other gravity base foundations.

As well as wind turbines, the present invention may also be used for other structures, such as offshore platforms and sheet walls or dolphin piles.

In addition, although in the above illustrative embodiments, the system has been described using a power supply provided on the installation vessel, it will be understood that other arrangements are possible. For example, a battery or generator located on the foundation or structure itself may be used as a power supply.

Moreover, although the present invention has been described in reference to offshore locations, it will be understood that the invention may be used in other locations where the soil has a sufficiently high moisture content for electro-osmosis. This may include, for example, fine-grained, cohesive clay sediments, low permeable problem soils, expansive soils, dispersive soils, high compressible clays, marine clays, sensitive clays, quick clays, saline/sodic soils, and soft peat. Such soft clay soils are often associated with costal soils, as well as estuaries, river and lake-side locations.

It will also be understood that the present invention allows for periodic re-strengthening of the soil around the foundation by reactivating the electro-osmosis effect to repel water from body and drain water collected at the second electrode. Equally, the present invention may allow for simplified retraction of the foundation during decommissioning by reactivating the electro-osmosis effect to form a fluid lubricating film over the body and thereby ease its withdrawal from the soil.

In this respect, with the invention, by applying a DC voltage across different parts of the foundation, two electro-osmosis effects are generated in the surrounding soil. Firstly, electro-osmosis causes the movement of water which acts to weaken or strengthen the soil at a closed boundary depending on the direction of flow. As such, an excess of soil pore pressure may be generated to lubricate the soil/foundation interface with a water film during installation or removal. Alternatively, a negative pore pressure may be used to restore or improve soil structure and interface friction for stabilising the foundation. For instance, soft clay or other cohesive soils may be consolidated around the foundation for strength by electro-osmotically pushing water out of the soil. A second effect of electroosmosis is that it acts to move ions within the soil, relative to the foundation. The ion effect may allow infiltration of cementing electrolytes to cement the foundation in place, which may be particularly useful with granular soils.

The insulating strip may also further comprise tapered resistivity regions extending vertically either side of the second electrode. The tapered resistivity regions may act to control the electric field strength distribution in the soil generated between the body and second electrode. That is, when a potential difference is applied across the electrodes, the tapered resistivity regions may act to reduce or mitigate the electric field strength to avoid excessively high field strengths in the areas directly adjacent the junction between the insulating strip and the body because of the relatively small distance between the electrodes. In some embodiments, the insulating material forming the insulating strip may be graduated as the distance from the second electrode increases to taper down the resistive effect. In this way, the taper of the resistance may be used to gradually counter the increased electric field strength because of proximity to achieve a more uniform electric field extending from the second electrode.

Finally, although the illustrative examples show embodiments of the invention with second electrodes provided on the exterior lateral surface, it will be understood that for hollow foundations, second electrodes may be provided on the interior lateral surface.

The invention claimed is:

1. A foundation for a structure comprising:
   a body having a lateral surface and a distal end for insertion into a soil, wherein the body is electrically conductive for functioning as a first electrode; and
   one or more second electrodes provided on the body and being flush with or sitting proud of the lateral surface, each second electrode extending transversely around the lateral surface and being electrically insulated therefrom by an insulating strip provided between the respective second electrode and the lateral surface,
   wherein the insulating strips are provided on the lateral surface of the body and each second electrode is provided on its respective insulating strip,
   wherein each second electrode and its respective insulating strip form a second electrode region, and
   wherein the second electrodes define the outer boundary of the foundation in the transverse plane across each second electrode region.

2. A foundation according to claim 1, wherein the one or more second electrodes comprise a plurality of second electrodes provided as bands across the body.

3. A foundation according to claim 1, wherein each insulating strip is provided as a band across the body.

4. A foundation according to claim 1, wherein each insulating strip is wider than its respective second electrode.

5. A foundation according to claim 1, further comprising wedge elements provided at the boundaries between the insulating strips and their respective second electrodes, each wedge element tapering radially outward from the insulating strip to the respective second electrode.

6. A foundation according to claim 1, wherein the body comprises an insertion region, terminating in the distal end, for insertion into the soil, and wherein
   the plurality of second electrodes are axially distributed along the insertion region.

7. A foundation according to claim 1, further comprising terminals for connecting the first and second electrodes to an electric power supply.

8. A foundation according to claim 7, wherein one or more of the plurality of second electrodes are connectable to the electric power supply independently of one or more other second electrodes.

9. A foundation according to claim 1, wherein each insulating strip comprises a resistively tapered region extending axially either side of its respective second electrode for regulating the spatial distribution of the electric field strength between the first and second electrodes.

10. A foundation according to claim 1, further comprising a plurality of fluid ports for supplying fluid to the surface of one or more of the plurality of second electrodes.

11. A wind turbine comprising:
    a generator assembly for generating electricity from wind; and
    a foundation according to claim 1 for supporting the generator assembly.

12. A method of installing a foundation according to claim 1, the method comprising:
    connecting one or more of the plurality of second electrodes to the positive terminal of a power supply for the second electrode to function as an anode;
    connecting the first electrode to the negative terminal of the power supply for the first electrode to function as a cathode;
    inserting the distal end of the body into the soil and applying a potential difference across the first and at least one of the second electrodes for generating an electro-osmotic effect to attract water in the soil to the first electrode for thereby facilitating the insertion of the body into the soil.

* * * * *